(12) United States Patent
Alzieu et al.

(10) Patent No.: US 6,458,489 B1
(45) Date of Patent: Oct. 1, 2002

(54) LEAD ACID BATTERY WITH IMPROVED PERFORMANCE

(75) Inventors: Jean Alzieu, Moret-sur-Loing; Jack Robert, Palaiseau, both of (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/673,718

(22) PCT Filed: Apr. 29, 1999

(86) PCT No.: PCT/FR99/01022

§ 371 (c)(1),
(2), (4) Date: Nov. 30, 2000

§ 102(e) Date: Nov. 30, 2000

(87) PCT Pub. No.: WO99/57782

PCT Pub. Date: Nov. 11, 1999

(30) Foreign Application Priority Data

Apr. 30, 1998 (FR) .............................................. 98 05509

(51) Int. Cl.⁷ ................................................ H01M 4/56
(52) U.S. Cl. ...................................... 429/225; 429/228
(58) Field of Search ................................ 429/225, 228, 429/60

(56) References Cited

U.S. PATENT DOCUMENTS

| | | |
|---|---|---|
| 4,476,203 A | 10/1984 | Robert et al. |
| 5,344,727 A | 9/1994 | Meadows et al. |
| 5,474,863 A | 12/1995 | Yamamoto |

FOREIGN PATENT DOCUMENTS

| | | |
|---|---|---|
| DE | 3532697 | 9/1985 |
| EP | 0070718 | 1/1983 |
| FR | 2425733 | 12/1979 |
| FR | 2438346 | 4/1980 |
| JP | 55069970 | 5/1980 |
| JP | 58064772 | 4/1983 |
| JP | 62249354 | 10/1987 |
| JP | 01 220371 | 9/1989 |
| JP | 02109263 | 4/1990 |
| JP | 09115518 | 5/1997 |
| JP | 09167619 | 6/1997 |
| WO | 97/30486 | 8/1997 |
| WO | 97/38457 | 10/1997 |
| WO | 98/43309 | 10/1998 |

OTHER PUBLICATIONS

J. Alzieu et al., "Structure of lead acid batteries adjusted to fast charge," The Fifth International Electric Vehicle Symposium, Philadelphia, Oct. 25, 1978.

P.W. Appel et al., "Capacity predictions for lead/acid battery plates having conductive additives," Journal of Power Sources, 55, 1995, pp. 81–85, Elsevier Science, (No month).

H. Ozgun et al., "Effect of plate preparation on active–material utilization and cycleability of positive plates in automotive lead/acid batteries," Journal of Power Sources, 52, 1994, pp. 159–171, Elsevier Science, (No month).

J. Landfors, "Cycle life test of lead dioxide electrodes in compressed lead/acid cells," Journal of Power Sources, 52, Nov. 1994, pp. 99–108, Elsevier Science.

Katsuhiro Takahashi, et al., "Physical Changes in Positvie Active Mass during Deep Discharge–Charge Cycles of Lead–Acid Cell," J. Electrochem. Soc. vol. 130, No. 11 Nov. 1983, pp. 2144–2149.

*Primary Examiner*—Patrick Ryan
*Assistant Examiner*—Susy Tsang-Foster
(74) *Attorney, Agent, or Firm*—Burns, Doane, Swecker and Mathis LLP

(57) ABSTRACT

In a lead-acid battery with stress applied perpendicular to the plane of the electrodes, at least one of the elements chosen from among the positive electrode, the negative electrode and the electrolyte has been modified so that the quantity of sulfuric acid in the positive electrode and/or negative electrode represents at least 0.20 mole of $H_2SO_4$ per mole of active material in the charged state.

14 Claims, 3 Drawing Sheets

LEAD ACID BATTERY WITH IMPROVED PERFORMANCE

This application is a national phase of PCT/FR99/01022 which was filed on Apr. 29, 1999, and was not published in English.

TECHNICAL FIELD

The invention relates to lead-acid batteries having improved performance compared with current lead-acid batteries.

Batteries of this type are particularly intended for the production of high-performance batteries, for electric vehicles for example.

STATE OF THE ART

During the 1970's, research into high performance batteries intended for electrical vehicles confirmed a known dilemma, but which particularly concerns lead-acid batteries: choosing between weight performance and endurance, improvement in one being achieved to the detriment of the other. At times priority was given to energy-to-weight ratio to such an extent that lifetimes fell to scarcely acceptable values. Therefore research was conducted to arrive at a better compromise.

During a 5-hour discharge under constant current, the energy-to-weight ratio of lead-acid batteries intended for electric vehicles ranges from 30 to 40 Wh/kg. On board vehicles, this range of magnitude is reduced by 20%. Therefore, at discharge times of 1 to 2 hours, the lead-acid battery proves to give two times less performance than the nickel-cadmium battery, and three times less than the sodium-sulphur battery.

It would therefore appear that the lead-acid battery ranks the lowest among possible candidates for the market of electric vehicles. Yet, over and above its price, some prospects plead in its favour.

Its performance in terms of charge time should increase with the arrival of specific vehicles that are lighter and more energy-saving. Its lifetime could be increased through intelligent management of its energy. Moreover, the lead-acid battery is probably, among those batteries competing for the new markets, the one which has the highest relative margin for progress.

To improve the performance of lead-acid batteries, it is required to increase the coefficient of use of the active materials of the electrodes. Two pathways of research can be considered to achieve this result. One concerns the collection of charges on the side of the active electrode materials. The other concerns a better distribution of the reagents within the electrodes.

The active material of the electrodes is in fact only used very little, even during a so-called complete discharge, the percentage of converted material being in the region of 25 to 30%.

In respect of charge collection, the electron exchanges between the active material and the outer circuit are ensured by lead alloy conductors in the form of grids or ribs. The size of these collectors is determined by the two following factors: the fact that they form the mechanical support for the electrodes, and the need to resist corrosion phenomena to which they are subject inside the electrodes. In consequence, in current assembly technology, so-called single pole assembly, the weight of the collectors represents between 40 and 50% of the weight of the electrodes for electric vehicle applications.

Regarding the distribution of reagents inside the electrodes, this is limited by the electrode porosities which may be used, as will be seen below.

For over a century, the plates of lead-acid batteries have been made using the Fauré method, the so-called grid and added oxide method. More precisely, a grid in lead alloy is lined with a paste made of lead oxide, sulphuric acid and water. The proportions of these various constituents were empirically determined having regard to the performance of the battery. It soon became apparent that the increase in the quantity of water, that is to say in resulting porosity, increases initial capacity to the detriment of lifetime. Values held to be acceptable for these two parameters limit variations in porosity to a narrow range, in the region of 10%.

Inside an electrode of a lead-acid battery, the quantity of sulphuric acid is much lower than the quantity of active matter likely to be oxidized or reduced. Their ratio is in the order of 15%. To this acid, present on site, additions are made during discharge brought by diffusion from outside the plates, which are more significant the slower the discharge. The coefficients of use of the active matter are highest in the vicinity of the surface of the plates. They may reach 60 to 70%, to be compared with the average value of 25 to 30% for the entire electrode.

Document FR-A-2 438 346 [I] and the publication by J. Alzieu et al., at the Fifth International Electric Vehicle Symposium, Philadelphia, Oct. 2–5, 1978 [2], describe lead-acid batteries with a long lifetime. These batteries have a positive electrode, a negative electrode, an electrolyte formed of sulphuric acid, a set of separator elements arranged between the positive electrode and the negative electrode and means for applying pressure to the whole assembly. It is indicated that with the application of pressure it is possible in particular to increase the lifetime of these lead-acid batteries.

The document J. Electrochem. Soc., vol 130, No. 11, 1983, pages 2144–2149 [3] illustrates a lead-acid battery which uses an active material for the positive electrode having a density of 3.9 g/cm$^3$$_1$, and an electrolyte made of sulphuric acid having a density of 1.28 at 20° C. With the use of such materials it is possible to restrict changes in the structure and physical properties of the active material of the positive electrode, for the purpose of improving its lifetime. In this document, pressure is also applied to the assembly of electrodes, by which means it is also possible to limit electrode structural changes.

The improvement brought by placing the electrodes under stress is of interest, but the energy-to-weight ratio of lead-acid batteries still remains insufficient compared with the performance it is desired to obtain.

Other improvements in lead-acid batteries have been considered by H. Ozgun et al., Journal of Power Sources, 52, 1994, pages 159–171 [4]. These improvements concern variation in the density of the active material of the electrodes. In this latter case, the authors recommend increasing the density of the active material in order to increase the battery's charging/discharging cycle capacity.

P. W. Appel and D. B. Edwards in Journal of Power Sources, 55, 1995, pages 81–85 [5] endeavoured to improve the performance of the lead-acid battery by improving the conductivity of the active material through incorporation of conductor particles, but they did not succeed in finding particles that were able to withstand the particularly corrosive medium of a positive electrode in a lead-acid battery.

Application of pressure to the electrode should bring about an improvement in the coefficient of use of the reagents inside the electrodes by using electrodes in the form of thin plates. It can be understood that a thin plate, that is to say in which every active material element is near a surface delimiting the plate, can have improved performance; the overall coefficient of use should be expected to be 60 to 70%.

With compression it is possible to remedy the special fragile nature of these thin plates. After considering a move in this direction, currently one of the lines of research adopted by the ALABA Advanced Lead Acid Battery Consortium, this approach has been abandoned since unsuspected experimental results have opened up new prospects.

The subject of the present invention is precisely a lead-acid battery of the type described in documents [1] to [3], which has an improved energy-to-weight ratio due to arrangements allowing an increase in the coefficient of use of the active materials of the electrodes by achieving a better distribution of the reagents within the electrodes.

DISCLOSURE OF THE INVENTION

The subject of the present invention is a leadacid battery containing:
- a positive electrode containing lead oxide as active material,
- a negative electrode containing lead sponge as active material,
- an electrolyte formed of a solution of sulphuric acid,
- a separator element between the positive electrode and the negative electrode, and
- means for applying a stress to the entire assembly perpendicular to the plane of the electrodes, in which, in the charged state, the quantity of sulphuric acid in the positive electrode represents at least 0.20 mole of $H_2SO_4$ per mole of active material of the positive electrode, and/or the quantity of sulphuric acid in the negative electrode represents at least 0.20 mole of $H_2SO_4$ per mole of active material in the negative electrode.

This quantity of sulphuric acid in the positive or negative electrode may, for example, represent from 0.20 to 1 mole, or from 0.20 to 0.70 mole of $H_2SO_4$ per mole of active material in the electrode.

Preferably, according to the invention, in the battery in the charged state, the quantity of sulphuric acid in the positive electrode represents at least 0.25 and even better 0.40 mole of $H_2SO_4$ per mole of active material in the positive electrode, and/or the quantity of sulphuric acid in the negative electrode represents at least 0.25 and even better 0.40 mole of $H_2SO_4$ per mole of active material in the negative electrode.

In the lead-acid battery of the invention, this improved distribution of reagents within the electrodes can be obtained by adopting one or more of the following arrangements, compared with the prior art:

1) modifying the structure of the positive electrode in order to increase the quantity of sulphuric acid in the positive electrode,
2) modifying the structure of the negative electrode in order to increase the quantity of sulphuric acid in the negative electrode, and
3) increasing the $H_2SO_4$ concentration of the electrolyte.

According to the invention, it is possible to use simultaneously two or three of these modifications to adjust sulphuric acid quantities in the positive electrode and/or in the negative electrode to desired values.

For, according to the invention, it has been discovered that the qualities of sturdiness of lead-acid batteries achieved by electrode compression, by applying a compression stress to the electrodes in the order of 0.01 to 0.3 MPa, made it possible to apply other arrangements able to improve the coefficient of use of the active material in the positive electrode, whereas such arrangements would have been hazardous in a conventional battery structure.

These arrangements particularly concern:
- increasing the $H_2SO_4$ concentration of the electrolyte,
- increasing the porosity of the electrodes, and
- including porous elements in these electrodes.

Therefore, according to a first embodiment of the invention, the porosity of the positive and/or of the negative electrode is modified. In this case, an electrode active material is used having an apparent density in the dry, charged state of 2.8 to 3.2 g/cm³, preferably from 3.0 to 3.2 g/cm³.

By increasing the porosity of the active material of the positive electrode and/or of the negative electrode, it is possible to increase the quantity of sulphuric acid per mole of active material, and therefore to promote exchanges between the active material of the electrode and the electrolyte.

To obtain an electrode active material with increased porosity, it is possible to proceed in the following manner.

As a general rule, the active material of the electrodes is obtained from a paste made of lead oxide, water and sulphuric acid by pasting a grid which serves to collect the current, followed by drying, then by maturing for 48 hours in a saturated steam atmosphere. By subsequently applying an electric current to the electrodes, lead dioxide $PbO_2$ is formed which serves as active material for the positive electrode and spongelike metallic lead is formed which serves as the active material for the negative electrode. In this production, the water and acid content of the lead oxide paste regulates the porosity of the active material subsequently obtained. According to the invention, all that is needed therefore is to adjust the water and acid content of the paste to obtain an active material having an apparent density lying within the range described above.

A further means of increasing the porosity of the active material of an electrode of the prior art, is to submit this electrode which contains a material generally having an apparent density in the dry, charged state of 3.3 to 3.6 g/cm³, to electric treatment consisting of at least one deep discharge followed by recharging.

This may be carried out by placing an element, made of conventional electrodes, in short-circuit at the end of discharge, for 48 hours for example. The effect of this deep discharge is to swell up the positive electrode and/or negative electrode, and hence to increase its porosity. However, after 150 to 200 charging/discharging cycles under normal operating conditions, the porosity of the electrode may have decreased and returned to its initial value. In this case, the increased porosity value can be restored by causing the electrode to re-undergo at least one deep discharging cycle.

According to a second embodiment of the invention, the structure of the positive electrode and/or of the negative electrode is modified by adding inert porous particles, able to charge themselves with electrolyte, in the active material of these electrodes. These porous particles may be microporous fragments of inert material such as polyethylene, polypropylene or any other polymer resistant to the electrolyte. The presence of electrolyte in these porous particles also makes it possible to increase the quantity of electrolyte per mole of active material in the electrode.

These porous particles may be added to the lead oxide paste used to line the grids or current collectors.

It is possible, in particular, to add a quantity of porous particles in the active material in such manner that they represent 5 to 80%, preferably 10 to 50%, of the final volume of the electrode material. In this way, the structure of the electrode active material is modified by increasing its porosity and its electrolyte content.

According to a third embodiment of the invention, the quantity of electrolyte is adjusted per mole of active material of the electrodes by increasing the density of the electrolyte. In this case, it is possible to use a solution of $H_2SO_4$ having a density of at least 1.30, for example from 1.30 to 1.50, and preferably from 1.32 to 1.40.

Advantageously, this third embodiment of the invention is combined with one of the two preceding embodiments.

Other characteristics and advantages of the invention will be better understood on reading the following description of examples of embodiment, which are evidently given for illustration purposes only and are not restrictive, with reference to the appended drawings.

BRIEF DESCRIPTION OF THE FIGURES

In FIG. 1, a lead-acid battery is shown comprising a positive electrode 1 in the form of a plate and a negative electrode 3 in the form of a plate, both plates separated from one another by an assembly comprising a separator element 5 that is corrugated and perforated, made in polyvinyl chloride PVC for example, and an element 7 such as fibrous netting made in glass fibre for example. The positive and negative electrodes are bathed in an electrolyte 9.

In this battery, the positive electrode is formed of lead oxide $PbO_2$ which covers an alveolar lead sheet or grid.

Negative electrode 4 is similarly formed from lead sponge.

Figure 1:
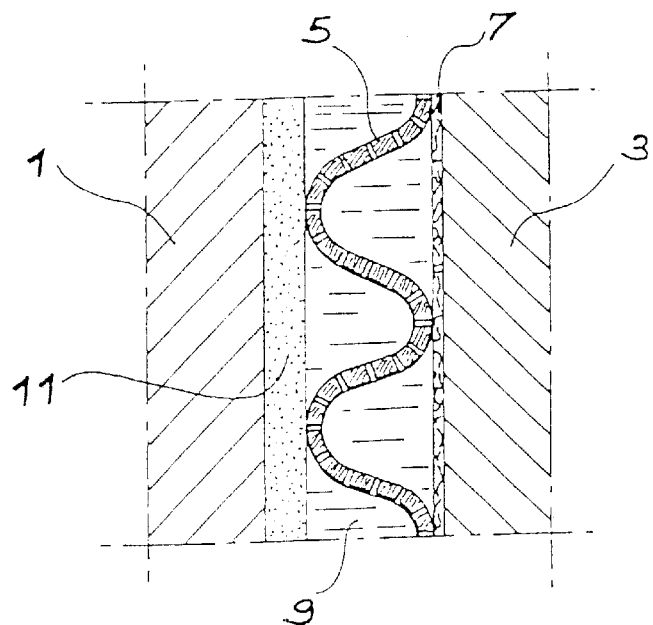
FIG. 1 is a vertical section diagram of a lead-acid battery in which the improvements of the invention can be used.

Preferably, according to the invention, as shown in FIG. 1, the positive electrode 1 is also separated from electrolyte 9 by a microporous element 11 which may formed of so-called Darak® paper made up of paper, glass wool and phenol resin.

Figure 2:
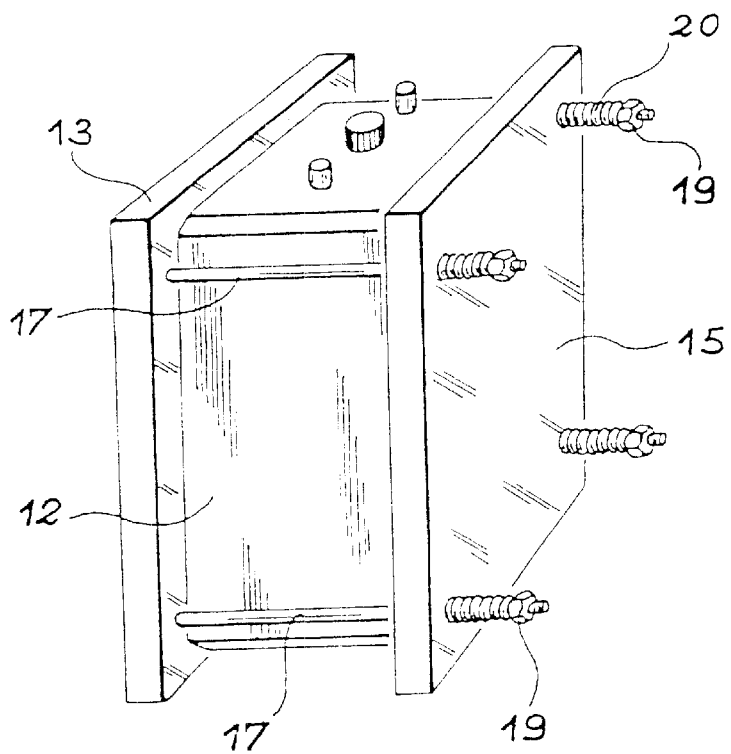
FIG. 2 is a perspective view of the assembly of the positive and negative electrodes in FIG. 1 with the application of pressure to the assembly.

In FIG. 2, the battery of FIG. 1 is shown, completed with the means for applying a stress to the assembly perpendicular to the plane of electrodes 1 and 3. In this case, the assembly 12 is arranged between two metal disks 13 and 15 which are connected to one another by a set of threaded rods 17 fitted with bolts 19 and tared springs 20.

It is therefore possible to apply to the assembly of electrodes 1 and 3 a stress in the region of 0.01 to 0.3 MPa, preferably a stress in the order of 0.1 MPa.

Figure 3:
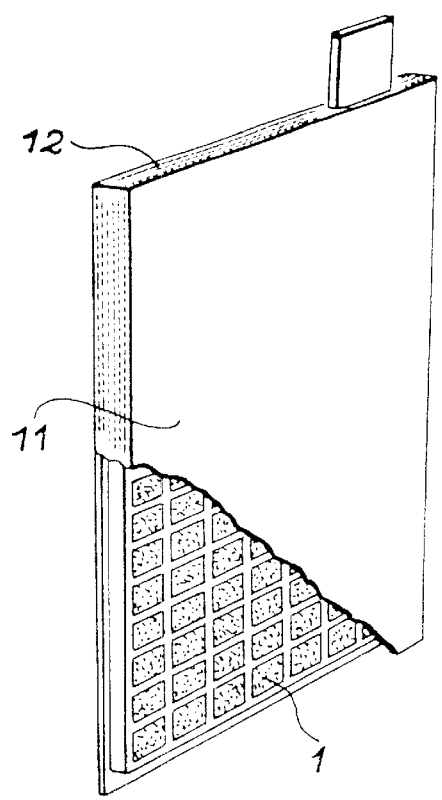
FIG. 3 is a perspective view of an embodiment of the positive electrode of the FIG. 1 arranged in a microporous separator.

FIG. 3 shows a perspective view of positive electrode 1 surrounded by the microporous separator 11. In this case, this separator entirely surrounds the electrode and is formed of two microporous separators welded on their periphery, for example with a line of thermosetting resin 12.

It is specified that in the lead-acid battery of the invention, the separator assembly formed by the separator element 5 and element 7 may be replaced by a single element formed of a glass fibre mat.

According to the invention, the performance of the battery described in FIGS. 1 to 3 is improved by using positive and/or negative electrodes having structures which lead to a higher quantity of electrolyte per mole of active material.

It was found that the application of a stress to the electrodes enabled the porosity of the electrode to be stabilized during cycling.

Figure 4:
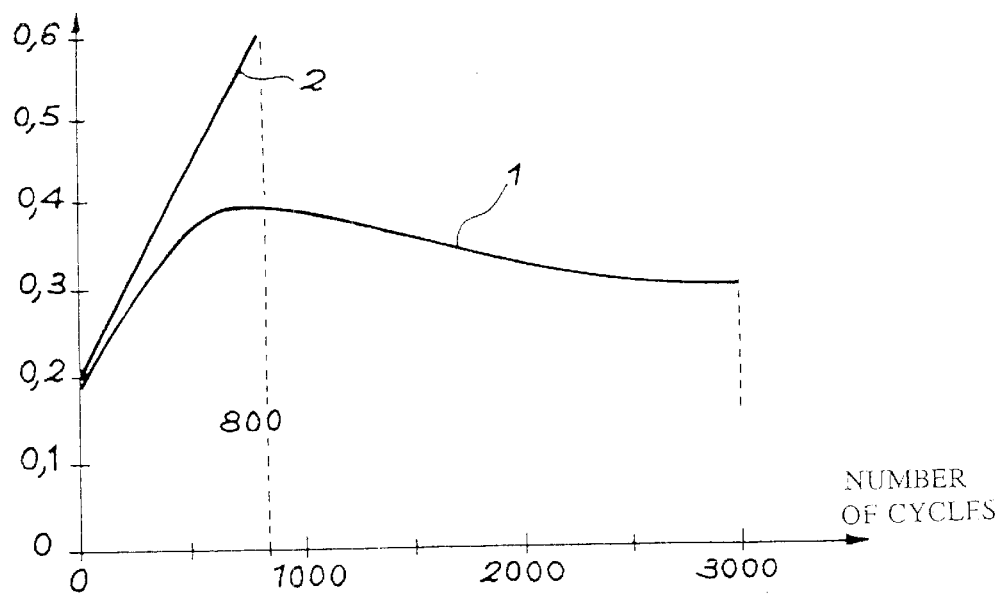
FIG. 4 illustrates the changes in the average pore radius of the active material in positive battery electrodes in relation to the number of cycles, in the case in which the electrode is subjected to a stress (curve 1) and when there is no stress (curve 2).

FIG. 4, curve 1, shows the changes in the average pore radius (in $\mu$m) of the active matter of a positive electrode under stress in relation to the number of cycles made.

In this figure, it can be seen that the average pore radius of the electrode increases firstly and then stabilizes after a slight decrease until the end of the lifetime of the battery (3000 cycles).

By way of comparison, this figure also shows, in curve 2, the changes in the average pore radius of a similar electrode used in a battery without application of a stress. In this case, the average pore radius increases over the entire cycling until the end of the lifetime (approximately 800 cycles).

According to the invention, by means of the electrode porosity stabilizing effect due to stress, it is possible to considerably increase the initial porosity of the electrode without harming the lifetime of this electrode.

On the other hand, if no stress is applied, it is known that an electrode whose initial porosity is more than 10% greater than that of conventional electrodes, has a lifetime which is reduced in unacceptable manner.

According to the invention, it is therefore possible to improve the performance of the lead-acid battery under stress as described above, by using materials having higher porosity as active materials for the positive and/or negative electrodes.

It is recalled that positive electrodes are generally prepared from a lead oxide paste which covers the lead alveolar sheets or grids used as support. After pasting these grids, they are left to dry and mature for 48 hours in a steam-saturated atmosphere. The active material $PbO_2$ is then formed by the application of an electric current. The active material of the negative electrodes is prepared in the same manner, but when the electric current is applied the lead oxide paste is reduced to lead sponge.

According to the invention, higher porosity of these active materials is obtained using a higher water and acid content in the paste.

It is also possible to obtain higher porosity of the active material of the electrode by carrying out a deep discharge of the electrode prepared from a lead oxide paste of conventional composition.

Figure 5:
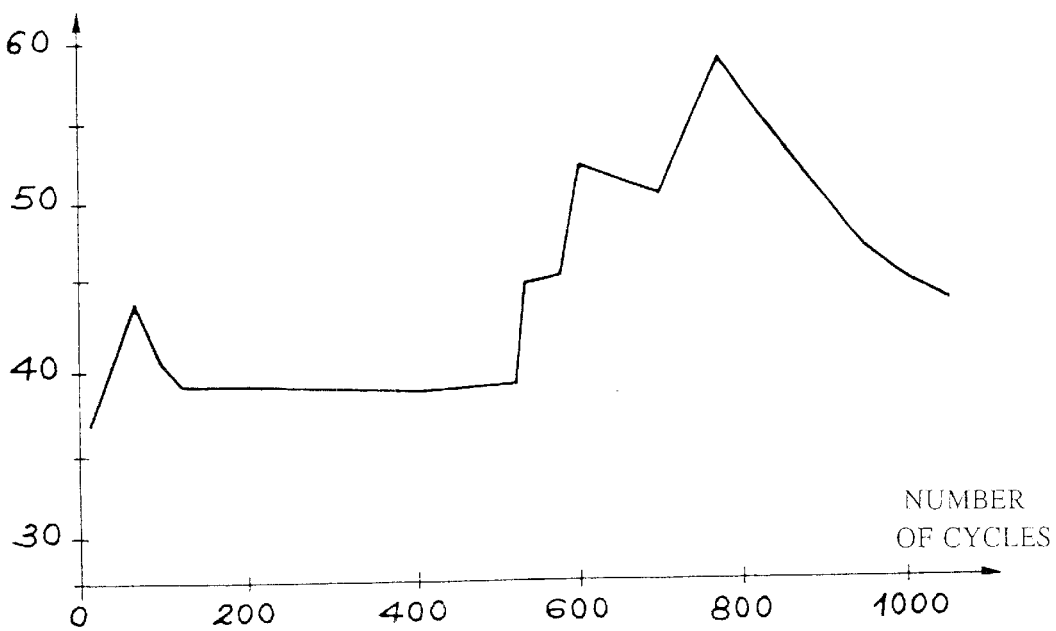
FIG. 5 shows the changes in capacity (in A.h.) of a battery under stress in relation to the number of cycles when several deep discharges of the electrodes are made between the $530^{th}$ and $750^{th}$ cycles.

FIG. 5 shows the capacity (in A.h.), in relation to number of cycles, of a battery under stress subjected to several deep discharges.

The cycling used was as follows:
discharge under constant current (11 A) for 3 h, and
charging under constant current in two levels:
level one: 6.65 A for 5 h, and
level two: 2 A for 4 h.

The capacities are measured during so-called control cycles, identical to the preceding ones except that for charging the second level under 2A is extended by 2 h, and discharging under 11 A is extended until the voltage at the battery terminals reaches 1.70 V.

As shown in FIG. 5, the capacity increases from the $1^{st}$ to the $65^{th}$ cycle, and then decreases to stabilize at around 39 A.h.

At the $530^{th}$ cycle, a deep discharge is carried out followed by recharging, and it is found that the capacity of the battery increases up to 45 A.h., i.e. by 15%.

From the $530^{th}$ to the $750^{th}$ cycle, various deep discharges are made which are of the two following types:
discharge under reduced current until the voltage falls to less than 1 V per element of the battery, which may go as far as short-circuiting maintained for 60 h,
succession of cycles comprising complete discharge, whereas up until the $530^{th}$ cycle the discharge was interrupted after 3 hours.

These two types of discharge were experimented separately and in combined manner. Periods of return to initial cycling made it possible to verify that the increase in capacity observed was not of a fleeting nature. In this manner, under a control discharge current of 11 A, a capacity of 60 A.h. is reached whereas the nominal capacity for this current is 39 A.h., i.e. an overall gain of more than 50%.

On and after the $750^{th}$ cycle, a further cycling as defined above is conducted. The objective is to analyze, in the absence of a deep discharge, the durable or non-durable character of the increase in capacity. After 250 cycles, that is to say at the $1000^{th}$ cycle, the capacity measured is always greater than the nominal capacity. The decrease appears to be linear. The slope is 5.5 A.h. per 100 cycles.

This result is fully surprising since normally the battery would be expected to be irretrievably deteriorated by a deep discharge obtained by extended short-circuiting.

All the more surprising is the fact that after further deep discharges, an additional increase is obtained in battery capacity which may exceed an overall gain of 50%.

This phenomenon could be attributed either to the improved conductivity of the active material, or to the increase in porosity. Experiments on conductivity have led to eliminating the hypothesis of reorganisation of the conductor framework which ensures charge collection within the active matter, and to preferring the assumption of a considerable increase in porosity of this active material. Subsequent research conducted confirmed this viewpoint.

It is known that during discharge of the positive electrode, the lead oxide is converted into lead sulphate according to the following reaction diagram:

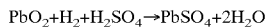

During discharge of the negative electrode, the lead is converted into lead sulphate according to the following reaction diagram:

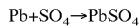

However, the lead sulphate produced has a higher volume than the original lead oxide or lead.

If a deep discharge is carried out, for example by short-circuiting the electrode at the end of discharging for 48 hours, and if the electrode is subsequently charged, the active material which converts to $PbO_2$ or Pb does not resume its initial volume. Therefore an increase in porosity is obtained which permits improvement in battery performance.

This increase is not long-lasting since after a period of 150 to 200 cycles, the active material of the electrode may resume its initial volume. However, it is possible to restore this higher porosity by again submitting the electrode to a deep discharge as indicated above.

A further possible way of increasing the porosity of the active material in each of the electrodes is to include porous elements in the material, for example porous particles incorporated in the lead oxide paste used to make the electrode.

Porous particles which may be used can be polyethylene particles whose smallest size is no more than 0.5 mm, preferably approximately 0.2 mm.

In the electrode(s), it is possible to use a proportion of porous particles representing from 2 to 50%, preferably from 5 to 30%, of the final volume of the electrode material. These particles may have a porosity of 60 to 70% by volume, which makes it possible to include an additional quantity of electrolyte in the active material.

According to the invention, it is also possible to improve the performance of the battery described in FIGS. 1 to 3 by using an electrolyte made up of a more concentrated solution of sulphuric acid having a density of at least 1.30, for example of 1.30 to 1.50, and preferably from 1.32 to 1.40.

The use of such high densities of sulphuric acid does not harm the lifetime of the lead-acid batteries in which, according to the invention, a stress is applied to the positive and negative electrodes.

Figure 6:
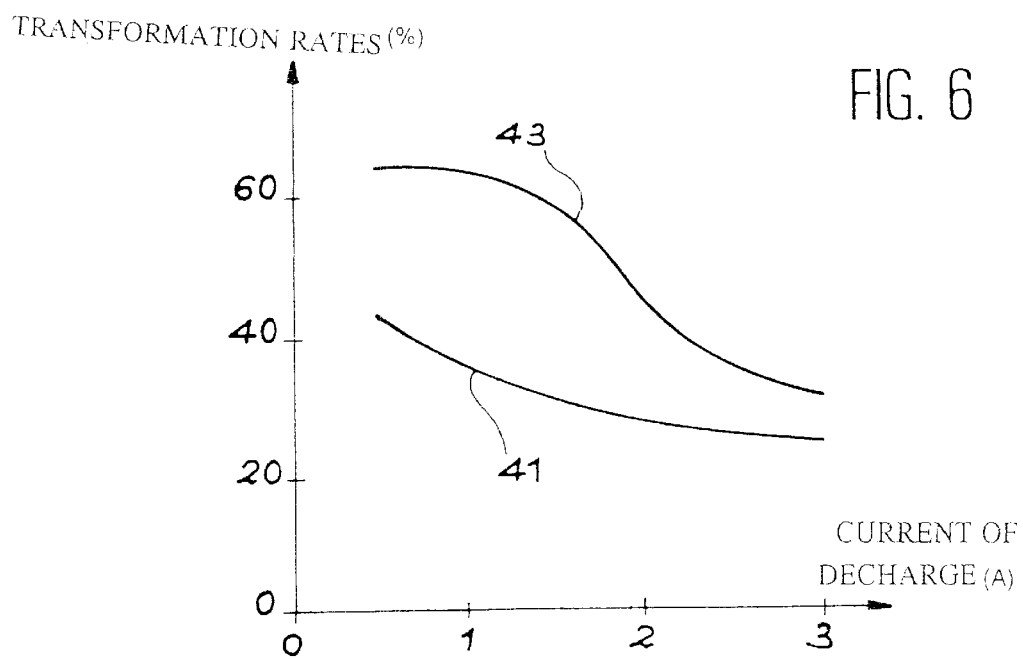
FIG. 6 illustrates the improvement obtained by increasing the ratio between the quantity of electrolyte and the quantity of active material, by forced circulation of electrolyte.

By way of example, a lead-acid battery conforming to reference [1] having a capacity of 26 A.h. with an electrolyte having a density of 1.28 will have this capacity increased to 30 A.h. with an electrolyte having a density of 1.32, and to 45 A.h. with an electrolyte having a density of 1.32 after six deep discharges. FIG. 6 illustrates the beneficial effect of an increased quantity of electrolyte per mole of active material. This FIG. 6 shows the changes in the rate of conversion (by %) of the active material of the positive electrode in relation to the discharge current (in amperes) for a lead-acid battery conforming to reference [1] (curve 41) and for a lead-acid battery of the same type (curve 43) in which the exchanges between the electrolyte and the active material have been promoted by producing forced circulation of electrolyte through the active material at a rate of 2 $\mu$m/s, which corresponds to an increased quantity of electrolyte per mole of active material.

In this figure, it can be clearly seen that electrolyte deficit is the limiting factor in respect of the rate of conversion of the active material in the positive electrode. For a discharge current of 1.25A, this conversion level is increased by 80% with forced circulation of the electrolyte, which confirms the advantage of the invention.

It is specified that in all the embodiments of the invention, the electrolyte used, which is formed of more or less dilute sulphuric acid, may be in the form of a gel, for example by means of $SiO_2$, or in a form absorbed in an appropriate material which may be a mat of micro-glass fibres acting as separator, or a microporous separator such as those denoted 5 and 11 in FIG. 1.

Although the above-described examples relate to a single pole battery, the invention evidently also applies to bipolar batteries.

In this case, the positive electrode and the negative electrode of the battery are associated together to form bipolar plates comprising, on one surface, the active material of the positive electrode and on the other surface the active material of the negative electrode.

If, with these bipolar plates, the previously described arrangements are used allowing an increase in the coefficient of use of the active materials of the electrodes through improved distribution of the reagents within the electrodes, it is possible not only to obtain an improvement in the power-to-weight ratio due to the bipolar structure but also an improvement in the energy-to-weight ratio.

Any bipolar wall leads to a substantial improvement in power-to-weight ratio for short demands of power. On the other hand, if no other arrangement is present, the energy-to-weight ratio is reduced, especially with 1 to 2-hour discharge times characteristic of electric vehicles. This is due to the fact that the electrodes, placed up against the bipolar wall, only offer one surface to the electrolyte which reduces by a factor of 2 the supply of reactive species from the electrolyte outside the electrodes.

The combination of improved coefficient of use of active material and the application of a bipolar structure would bring gains both in respect of power-to-weight ratio and in respect of energy-to-weight ratio.

What is claimed is:

1. Lead-acid battery comprising:
   a positive electrode (1) containing lead oxide as active material,
   a negative electrode (3) containing lead sponge as active material,
   an electrolyte (9) formed of a solution of sulphuric acid,
   a separator element (5, 7) between the positive electrode and the negative electrode, and
   means for applying a stress to the assembly perpendicular to the plane of the electrodes, in which, in the charged state, the quantity of sulphuric acid in the positive electrode represents at least 0.20 mole of $H_2SO_4$ per mole of active material in the positive electrode, and/or the quantity of sulphuric acid in the negative electrode represents at least 0.20 mole of $H_2SO_4$ per mole of active material in the negative electrode, and in which the stress applied to the electrodes is 0.01 to 0.3 Mpa.

2. Battery according to claim 1, in which, in the charged state, the quantity of sulphuric acid in the positive electrode represents at least 0.25 mole of $H_2SO_4$ per mole of active material in the positive electrode, and/or the quantity of sulphuric acid in the negative electrode represents at least 0.25 mole of $H_2SO_4$ per mole of active material in the negative electrode.

3. Battery according to claim 1, in which the active material of the positive electrode has an apparent density in the dry, charged state of 2.8 to 3.2 $g/cm^3$.

4. Battery according to claim 1, in which the active material of the negative electrode has an apparent density in the dry, charged state of 2.8 to 3.2 $g/cm^3$.

5. Battery according to claim 1, in which a positive electrode is used whose active material has an apparent density in the dry, charged state of 3.3 to 3.6 $g/cm^3$ and which is caused to undergo at least one deep discharge followed by recharging to bring its apparent density in the dry, charged state to a value of 2.8 to 3.2 $g/cm^3$.

6. Battery according to claim 1, in which a negative electrode is used whose active material has an apparent density in the dry, charged state of 3.3 to 3.6 $g/cm^3$ and which is caused to undergo at least one deep discharge followed by recharging to bring its apparent density in the dry, charged state to a value of 2.8 to 3.2 $g/cm^3$.

7. Lead-acid battery according to claim 1, in which the active material of the positive electrode and/or the active material of the negative electrode also contains inert porous particles able to charge themselves with electrolyte.

8. Battery according to claim 7, in which the porous particles are in polyethylene.

9. Battery according to claim 7, in which the quantity of porous particles represents 5 to 80% of the final volume of electrode material.

10. Battery according to claim 7, in which the quantity of porous particles represents between 10 and 50% of the final volume of electrode material.

11. Battery according to claim 1, in which a solution of sulphuric acid is used as electrolyte having a density of at least 1.30.

12. Battery according to claim 11, in which the density of the sulphuric acid solution ranges from 1.30 to 1.50.

13. Battery according to claim 1, in which the positive electrode and the negative electrode are associated together to form bipolar plates comprising, on one surface, the active material of the positive electrode, and on the other surface the active material of the negative electrode.

14. Battery according to claim 11, in which the density of the sulphuric acid solution ranges from 1.32 to 1.40.

* * * * *